US010811880B2

(12) United States Patent
Kim et al.

(10) Patent No.: US 10,811,880 B2
(45) Date of Patent: Oct. 20, 2020

(54) BATTERY MANAGING DEVICE AND BATTERY ENERGY STORING SYSTEM

(71) Applicant: HYOSUNG HEAVY INDUSTRIES CORPORATION, Seoul (KR)

(72) Inventors: Hong Seok Kim, Anyang-si (KR); Jin Ho Lee, Suwon-si (KR)

(73) Assignee: HYOSUNG HEAVY INDUSTRIES CORPORATION, Seoul (KR)

(*) Notice: Subject to any disclaimer, the term of this patent is extended or adjusted under 35 U.S.C. 154(b) by 211 days.

(21) Appl. No.: 16/067,365

(22) PCT Filed: Dec. 23, 2016

(86) PCT No.: PCT/KR2016/015213
§ 371 (c)(1),
(2) Date: Jun. 29, 2018

(87) PCT Pub. No.: WO2017/116087
PCT Pub. Date: Jul. 6, 2017

(65) Prior Publication Data
US 2019/0013673 A1    Jan. 10, 2019

(30) Foreign Application Priority Data
Dec. 30, 2015    (KR) .......................... 10-2015-0190488

(51) Int. Cl.
*H02J 3/32*    (2006.01)
*H02J 7/00*    (2006.01)
(Continued)

(52) U.S. Cl.
CPC .............. *H02J 3/32* (2013.01); *H02J 7/0013* (2013.01); *H02J 7/0019* (2013.01);
(Continued)

(58) Field of Classification Search
CPC ......................................................... H02J 3/32
(Continued)

(56) References Cited

U.S. PATENT DOCUMENTS

2001/0012211 A1    8/2001    Hasegawa et al.
2005/0242781 A1*   11/2005   Nakagawa ................ F02C 3/20
                                                    320/137
(Continued)

FOREIGN PATENT DOCUMENTS

JP    2006-042422 A    2/2006
JP    2014-131369 A    7/2014
(Continued)

*Primary Examiner* — Adi Amrany
(74) *Attorney, Agent, or Firm* — Novick, Kim & Lee, PLLC; Jae Youn Kim

(57) ABSTRACT

Provided is a battery managing device that stores surplus power provided from a system via a power managing device, and controls the charging and discharging of a battery formed of multiple battery modules which supply stored power to the system. The battery managing device includes: a switch block that connects the multiple battery modules to the power managing device; a charging circuit that charges the battery by means of the power input from the power managing device; a smoothing circuit that discharges or charges the battery according to the real-time power deficit/surplus state of the system; and a control circuit that controls the operation of the switching block, the charging circuit, and the smoothing circuit.

6 Claims, 9 Drawing Sheets

(51) Int. Cl.
*H02J 7/35* (2006.01)
*H02J 7/34* (2006.01)

(52) U.S. Cl.
CPC .......... *H02J 7/0021* (2013.01); *H02J 7/0047* (2013.01); *H02J 7/34* (2013.01); *H02J 7/35* (2013.01); *H02J 7/0048* (2020.01); *Y02E 40/10* (2013.01)

(58) Field of Classification Search
USPC .......................................................... 307/20
See application file for complete search history.

(56) References Cited

U.S. PATENT DOCUMENTS

| | | | | |
|---|---|---|---|---|
| 2011/0204720 A1* | 8/2011 | Ruiz | ........................ | H02J 3/14 |
| | | | | 307/66 |
| 2014/0009117 A1* | 1/2014 | Ishii | ........................ | H02J 7/34 |
| | | | | 320/126 |
| 2015/0263546 A1* | 9/2015 | Senoo | ....................... | H02J 3/32 |
| | | | | 320/134 |
| 2017/0324268 A1* | 11/2017 | Hanada | ..................... | H02J 3/32 |
| 2017/0371000 A1* | 12/2017 | Fukushima | .......... | G01R 31/392 |
| 2018/0226811 A1* | 8/2018 | Hanada | ............... | H01M 10/482 |

FOREIGN PATENT DOCUMENTS

| | | | | |
|---|---|---|---|---|
| KR | 10 2013 0115922 | * | 9/2013 | ............ G06Q 50/60 |
| KR | 10-2014-0117743 A | | 10/2014 | |
| KR | 10-1493785 B1 | | 2/2015 | |

\* cited by examiner

BATTERY MANAGING DEVICE AND BATTERY ENERGY STORING SYSTEM

FIELD OF THE INVENTION

The present invention relates to a battery management system and a battery energy storage system, and more particularly, to the battery management system and the battery energy storage system available to a power grid connected to renewable energy.

BACKGROUND OF THE INVENTION

With industrial development, the demand for power is gradually increasing and differences in electric power consumption between day and night, seasons, and days are gradually deepening.

Recently, for the reason, a lot of techniques to reduce peak load by using the surplus power of a power grid are rapidly being developed. Among them, a representative technique is a battery energy storage system for storing surplus power of the power grid in a battery or supplies insufficient power thereof from the battery.

While storing surplus power at night or generated from renewable energy such as wind power, and sunlight, the battery energy storage system supplies the power stored in the battery at the peak load or in an accident of the power grid. This may stabilize the power of the power grid unstably fluctuating by renewable energy sources, reduce peak load, and smooth load.

Due to the limitations of battery packing technology, such battery energy storage system is configured to have battery racks generally consisting of at least one battery by connecting the battery racks in parallel.

Meanwhile, the power of the power grid unstably fluctuating by the renewable energy sources requires smoothing not only in a peak time when demand for power is high but also in an off-peak time when demand for power is low because renewable energy is not consistently generated.

Accordingly, a power generation system using a renewable energy source requires battery modules not only for storing energy in preparation for the peak time but also for smoothing even for the off-peak time.

In general, as for an energy storage system or ESS applied to a renewable power generation system, the maximum rate of shifting a moving average of the integrated power of the renewable power generation system may be limited within the allowable scope of fluctuation by using the ESS. In other words, the maximum rate of shifting the moving average regarding only the power of the renewable power generation system is limited within the allowable scope of fluctuation by using the ESS.

Additionally, when the ESS manages the demand for power by storing the power of the renewable power generation system and discharging the power at a required time, another ESS is necessary to be additionally installed and this requires the capacity of the ESS to be increased in order to stabilize the existing power regarding the integrated power by integrating the power of the existing renewable power generation system with that of the additionally installed ESS, and therefore, this increases installation costs.

SUMMARY OF THE INVENTION

It is an object of the present invention to provide a battery management system and a battery energy storage system capable of minimizing costs necessary for an energy storage system or ESS applied to a renewable power generation system.

It is the other object of the present invention to provide a battery management system and a battery energy storage system capable of satisfying uses for storing and smoothing energy at low costs.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art.

DETAILED DESCRIPTION OF THE PREFERRED EMBODIMENTS

Detailed explanation of the present invention is made by referring to attached drawings that illustrate specific embodiment examples of this present that may be executed.

Upon explanation of the present invention, terms such as first, second, etc. may be used to explain various components but the components may not be defined by such terms. The terms are used only for the purpose of distinguishing one component from another. For example, a first component may be named as a second one not beyond the scope of right of the present invention, and similarly, a second component may be named as a first one.

If it is mentioned that a component is connected or linked to another one, it may be understood that the component may be directly connected or linked to the another one but another component may also exist in-between.

The terms used in this specification are used to explain only a specific example embodiment but not to define the present invention. A singular expression may include a plural one unless it is obviously different in the context.

It can be understood that terms, such as include or implement in this specification, which are used to indicate that there are features, numerals, steps, movements, components, parts or their combinations described herein does not exclude existence of, or a possibility of adding, one or more other features, numerals, steps, movements, components, parts, or their combinations in advance.

In addition, shapes, sizes, etc. of elements in drawings may be exaggerated to explain clearly.

Figure 1:
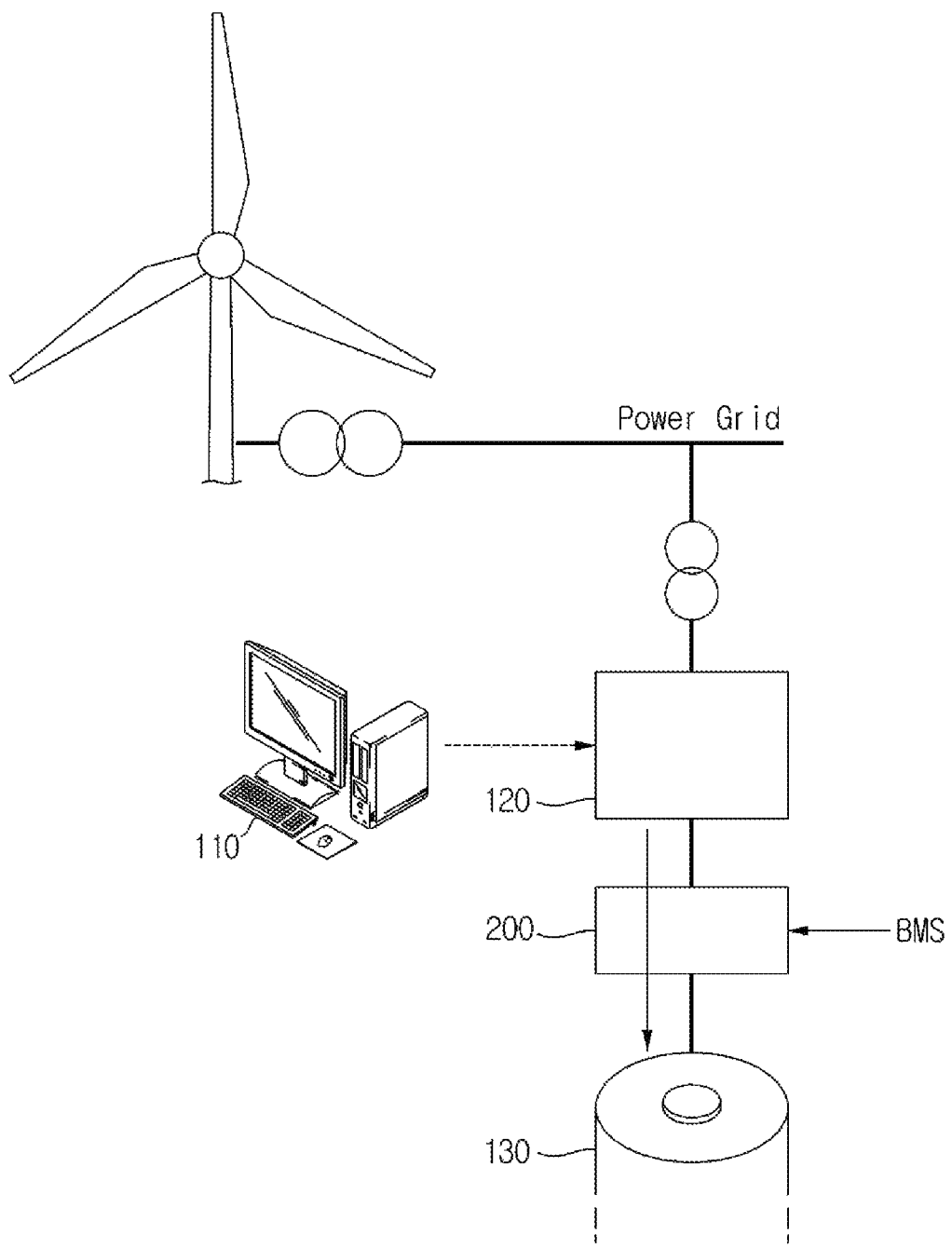
FIG. 1 is a concept diagram illustrating a configuration of a renewable energy storage system to which a battery management system or BMS and a battery energy storage system in accordance with a conception of the present invention are applicable.

FIG. 1 is a diagram illustrating a configuration of a renewable energy storage system to which a battery management system and a battery energy storage system in accordance with a conception of the present invention are applicable.

By referring to FIG. 1, the renewable energy storage system is composed of an energy management system or EMS 110, a power control system or PCS 120, a BMS 200, and a battery 130. The EMS 110 generally manages renewable power including wind power, and solar power. The PCS 120 converts power to charge the battery 130 from a power grid and discharge the battery 130 to the power grid.

The BMS 200 controls and manages charging and discharging of the battery 130 in minute detail by a command of the EMS 110 and performs a role in switching between the battery 130 and the PCS 120.

Figure 2:
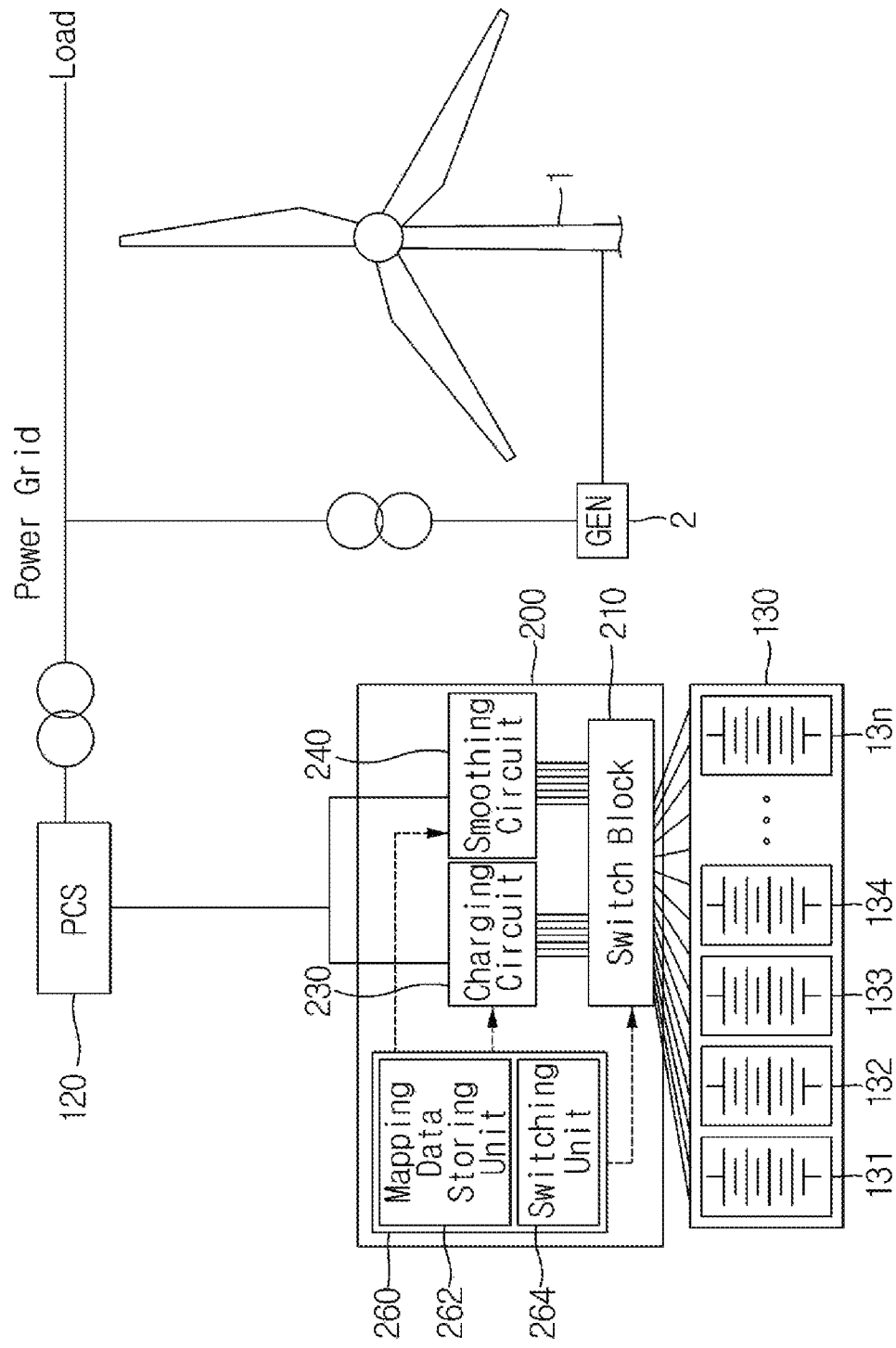
FIG. 2 is a block diagram illustrating a BMS and a battery energy storage system including it in accordance with one example embodiment of the present invention.

FIG. 2 illustrates a BMS in accordance with one example embodiment of the present invention.

The illustrated BMS 200 stores surplus power provided from the power grid via the PCS 120 and controls charging and discharging the battery 130 with multiple battery modules 131 to 13$n$ for supplying the stored power to the power grid. In accordance with an embodiment, the battery 130 may have multiple battery racks, each of which has multiple battery modules, but for convenience of explanation, the battery will be simplified to have multiple battery modules 131 to 13$n$ to make explanation.

The BMS 200 includes a switch block 210 for connecting multiple battery modules 131 to 13$n$ included in the battery 130, a charging circuit 230 for charging the battery 130 with power inputted from the PCS 120, a smoothing circuit 240 for discharging or charging the battery 130 depending on a real-time state of power shortage or surplus of the power grid, and a control circuit 260 for controlling operations of the switch block 210, the charging circuit 230, and the smoothing circuit 240. Herein, the control circuit 260 virtually divides a capacity of the battery 130 into a capacity for a battery for storing energy and that for a battery for smoothing energy in accordance with a conception of the present invention.

Virtually dividing a capacity for a battery for storing energy and that for a battery for smoothing energy means dividing the capacity into the capacity for the battery for storing energy and that for the battery for smoothing only as software but not as hardware and in accordance with more improved embodiment, areas divided for the battery for storing energy and for the battery for smoothing may be changed during an operation.

The control circuit 260 may generally control operations of the switch block 210, the charging circuit 230, and the smoothing circuit 240.

To achieve the conception of the present invention, the control circuit 260 may set some of the multiple battery modules 131 to 13$n$ included in the battery 130 as the battery for storing energy and other modules as the battery for smoothing.

At a peak time of power demand, the control circuit 260 may conduct smoothing operation by adding power stored in the battery for storing energy to the battery for smoothing and at an off-peak time, while preferentially storing the surplus power in the battery for energy and when the battery for storing energy is fully charged, it may store the surplus power in the battery for smoothing.

When surplus power of a power grid or power generated by a renewable power generator is inputted via the PCS 120, the charging circuit 230 stores the power in the battery for storing energy in the battery 130, depending on a certain charging schedule. The charging schedule may be received from the EMS 110 in FIG. 1.

In order to stabilize the power of the power grid or the power generated by the power of the renewable power generator, the smoothing circuit 240 supplies to the PCS 120 the power which has been charged in a smoothing area of the battery 130 or stores ripple power which has been permitted from the PCS 120 to the smoothing area of the battery 130.

In accordance with an embodiment, the switch block may switch connections between power output lines of the battery modules 131 to 13$n$ and the PCS or those between the power output lines of the battery modules 131 to 13$n$ and the smoothing circuit 240 and/or the charging circuit 230.

In accordance with an embodiment, relationships between hardware positions of battery blocks included in the battery and signals for identification of the battery modules 131 to 13$n$ recognized by the PCS 120 (or the smoothing circuit 240 and the charging circuit 230) may be fixed or flexible. When the relationships therebetween are fixed, the switch block performs only connections or disconnections between power output lines of individual battery modules 131 to 13$n$ and power input lines of other components.

When the relationships therebetween are flexible, the switch block 210 performs an operation of optionally connecting power output lines of individual battery modules 131 to 13$n$ with power input lines of other components. To this end, the switch block 210 may have a structure of switching in a multiplexing method.

In the latter case, the battery modules 131 to 13$n$ may be distinguished by using signals for identification mapped with the PCS 120 (or the smoothing circuit 240 and the charging circuit 230). To this end, the control circuit 260 may have a mapping data storing unit 262 for recording relationships of mapping signals for identification of the battery modules 131 to 13$n$ and signals for identification of battery areas recognized by the charging circuit 230 and the smoothing circuit 240, and a switching unit 264 for creating switching signals of individual switches included in the switch block 210 depending on the stored mapping data.

For example, when a peak time starts, the control circuit 260 in the aforementioned mapping structure may set the battery modules 131 to 13$n$, which have been set for storing energy, as those for smoothing and set a higher priority of charging and discharging in smoothing work than battery modules that have been set for smoothing at an off-peak time. When the peak time ends, it may preferentially set charged modules among the battery modules, which have been set for smoothing, as those for storing energy. Because it is common that a standby power resource is not sufficient at the peak time, the control circuit 260 may set all of the battery modules 131 to 13$n$ available included in the battery for smoothing when the peak time starts.

In accordance with an embodiment, it may be controlled to prevent battery modules set for smoothing at an off-peak time before a specific peak time and those set for smoothing at an off-peak time after the specific peak time from being overlapped. This is to prevent aging of only some of modules in battery as only one battery module is intensively charged and discharged.

The explanation on a course of the control circuit 260 storing renewable power by using the battery area for storing energy and the charging circuit 230 will be made as follows:

When the current time is to charge renewable energy, a capacity of a battery is virtually divided into a capacity for a battery for storing renewable energy and that for a battery for smoothing renewable energy. Now, when a capacity of a battery for storing renewable energy is smaller than a design capacity thereof, renewable energy is charged to the battery for storing renewable energy and when the capacity is greater than the design capacity, the renewable energy is charged to, or discharged from, the battery for smoothing the renewable energy.

When the current time is to discharge renewable energy, the capacity of the actual battery which combines the capacity virtually divided for the battery for storing renewable energy and for the battery for smoothing renewable energy during the charging time is applied.

The functions performed during a course of the control circuit 260 smoothing renewable power by using the area for the battery for smoothing and the smoothing circuit 240 will be explained as follows:

When a current capacity is greater than the remaining capacity of power resulting from the maximum rate of shifting a moving average added to current integrated power, the integrated power is increased as much as the maximum rate of shifting. Besides, when the current capacity is greater than the remaining capacity of the current integrated power, the integrated power remains as it is.

When the capacity is greater than the remaining capacity of the power resulting from the maximum rate of shifting a moving average subtracted from the current integrated power, the integrated power is reduced as much as the maximum rate of shifting. The PCS 120 produces power by adding power excluding the integrated power from the renewable energy to the power charged to the battery for storing renewable energy.

FIG. 2 illustrates not only a BMS 200 but also a battery energy storage system including the BMS 200. From this point of view, the illustrated battery energy storage system may include a battery 130 with multiple battery modules for storing surplus power provided from the power grid and supply the stored power to the power grid, a PCS 120 for converting power between the battery 130 and the power grid, and a BMS 200 in accordance with a conception of the present invention.

The BMS 200 includes a switch block 210 for connecting the multiple battery modules 131 to 13*n* to the PCS 120, a charging circuit 230 for charging the battery 130 with power inputted from the PCS 120, a smoothing circuit 240 for discharging or charging the battery 130 depending on real-time state of power shortage or surplus of the power grid, and a control circuit 260 for controlling operations of the switch block 210, the charging circuit 230, and the smoothing circuit 240, wherein the control circuit 260 virtually divides a capacity of the battery 130 into a capacity for a battery for storing energy and that for a battery for smoothing energy.

A power grid connected to the illustrated battery energy storage system may be a power grid where power from a renewable source and consumption power of load exist together or where only consumption power of load exists. But a function of setting a virtual area of the battery for smoothing energy in accordance with a conception of the present invention is more useful in the power grid where power from a renewable source and consumption power of load exist together. In the diagram, a wind power system composed of a windmill 1 and a generator 2 is connected to a power grid with load.

In accordance with an embodiment, the battery energy storage system may receive environmental information or control indication from an external EMS and output a state of operation. When it is connected to the power grid where the power from the renewable source and the consumption power of the load exist together and it is linked with the external EMS, it can be found to have the same structure as illustrated in FIG. 1.

In this case, the control circuit 260 may set some of the battery 130 as a battery for storing energy depending on information on charging amount inputted from the external EMS and may set some of the battery 130 as a battery for smoothing depending on information on amount of power variation inputted from the external EMS.

For example, the PCS 120 may have an inverter and a converter with IGBTs.

In accordance with an embodiment, the PCS 120 may include a smoothing PCS block for smoothing, and a REC PCS block for storing energy. In this case, the smoothing PCS block may be connected to the smoothing circuit 240 and the REC PCS block may be connected to the charging circuit 230.

Figure 3A:
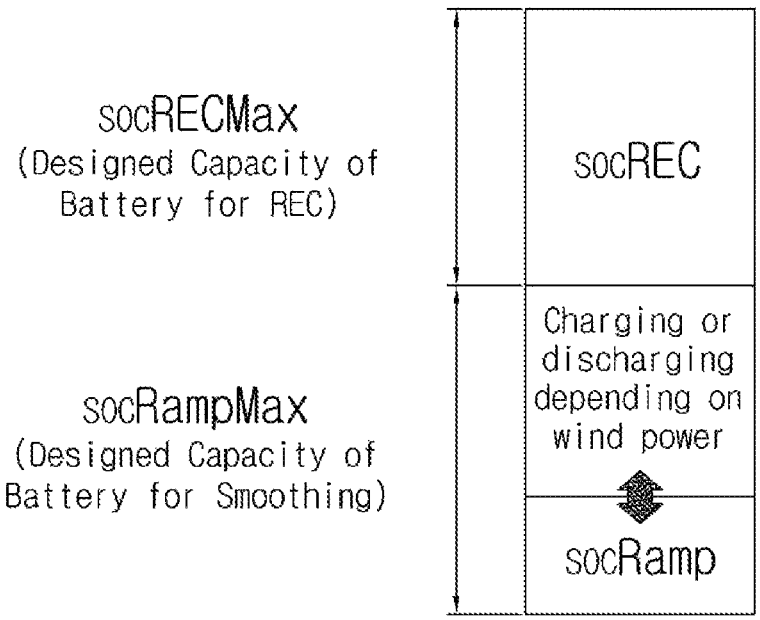
FIGS. 3A to 3C are diagrams and a graph to explain a state of operating a battery in accordance with a conception of the present invention at a peak time.
Figure 3B:
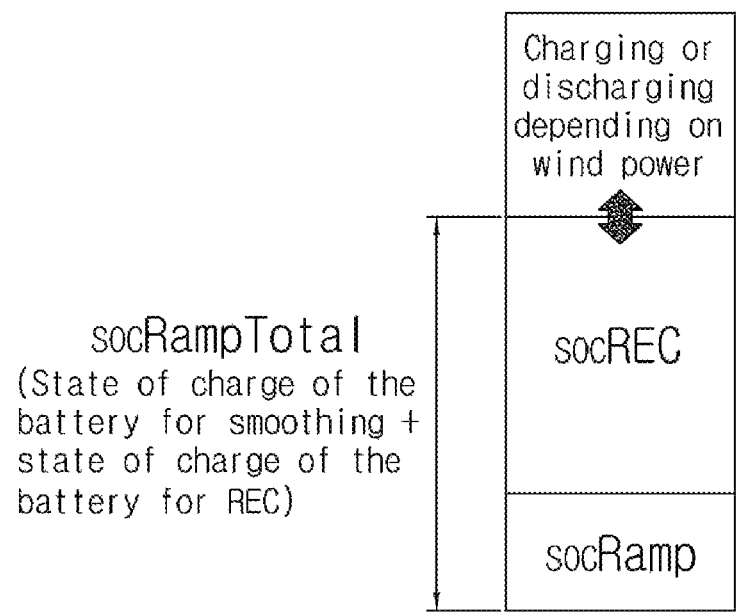
Figure 3C:
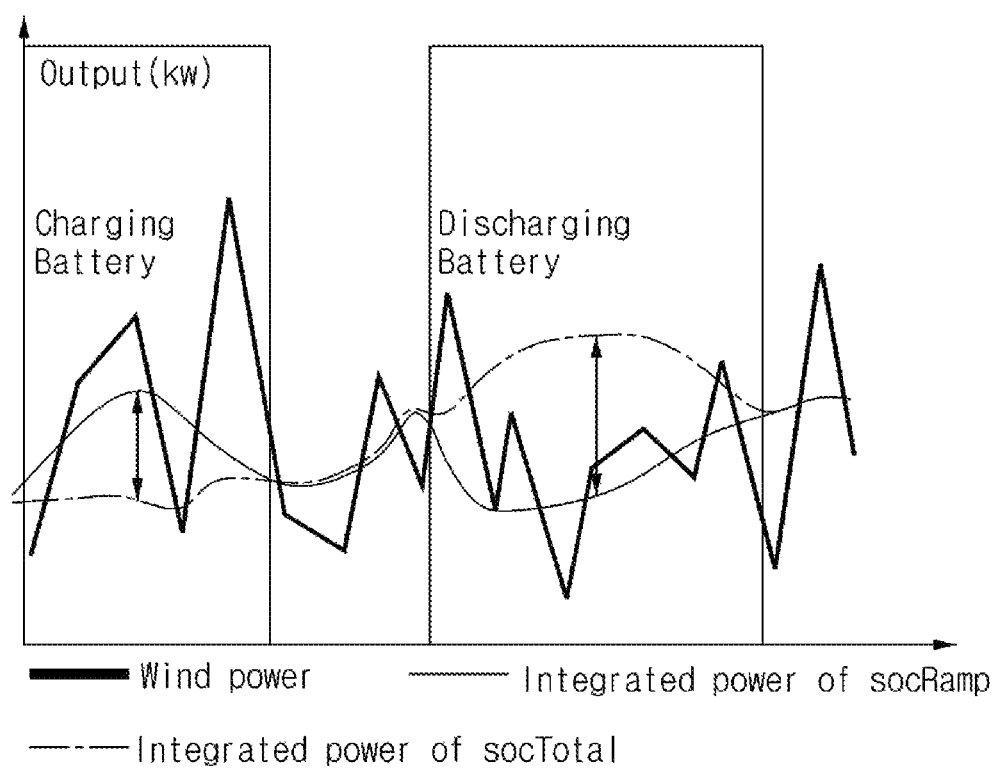

FIGS. 3A to 3C are to explain a state of operating a battery in accordance with a conception of the present invention at a peak time. As illustrated, a smoothing operation is conducted by adding power stored in a battery area for storing energy (REC) to a battery area for smoothing at a peak time and work of smoothing renewable energy is conducted with integrated power combining between wind power as renewable energy and that of an ESS. The power stored in the area for REC is outputted together.

More specifically, FIG. 3A illustrates the state of charging just before a peak time as power has been stored by being charged to an area of the battery for REC during off-peak time (socREC) and wind power is smoothed through charging or discharging of the power according to the wind power in the area of the battery for smoothing (scoRamp).

In FIG. 3B, when a peak time starts, smoothing of renewable power is conducted by totaling up the capacity of the battery for REC and that for smoothing. This automatically increases integrated power due to a lot of power stored in the battery and the increased integrated power is power (socREC) charged to the area of the battery for REC at a previous off-peak time.

The graph in FIG. 3C shows that difference between integrated power for smoothing operated only with socRamp and that for smoothing operated with the total charge of the current battery as socTotal is the power charged or discharged with socREC.

Figure 4A:
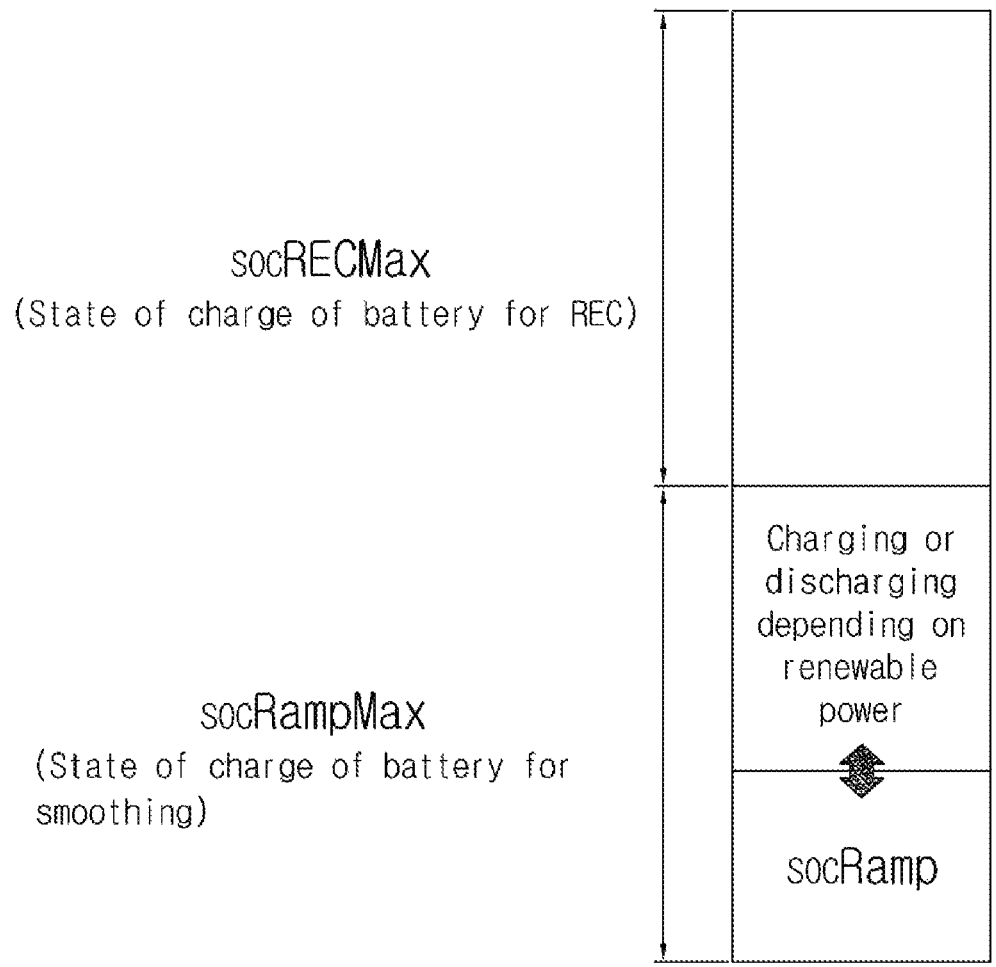
FIGS. 4A to 4C are diagrams to explain a state of operating a battery in accordance with a conception of the present invention at an off-peak time.
Figure 4B:
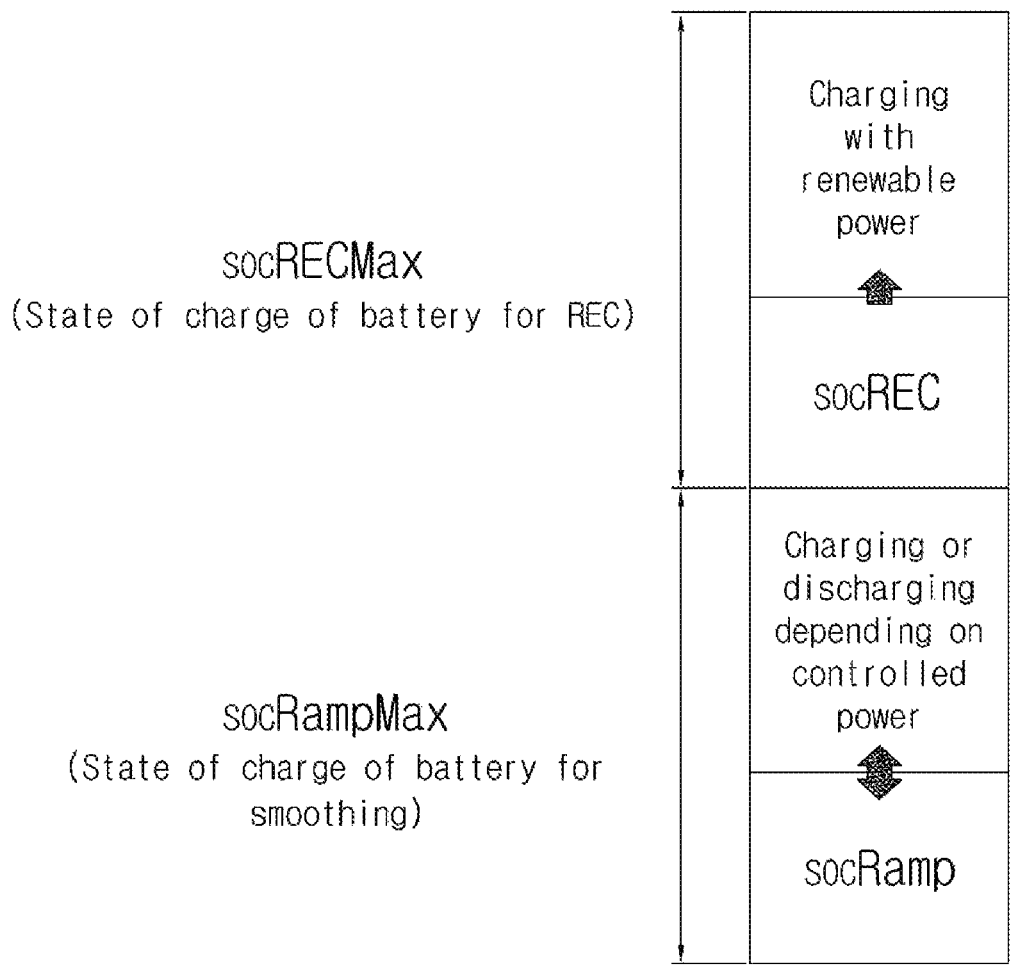
Figure 4C:
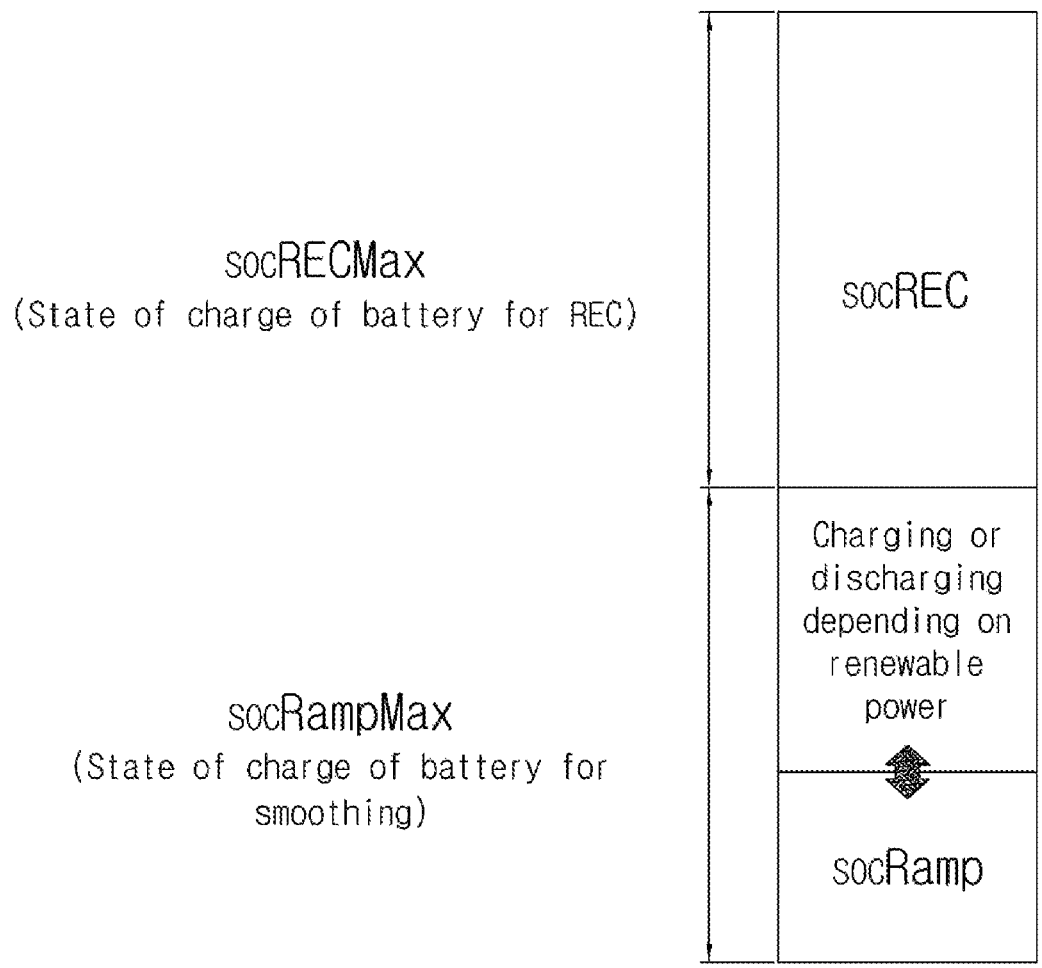

FIGS. 4A to 4C are to explain a state of operating a battery in accordance with a conception of the present invention at an off-peak time. As illustrated, the renewable power is preferentially stored in the battery for REC at the off-peak time and when the battery for REC is fully charged, the power comes to be charged to the battery for smoothing.

More specifically, FIG. 4A illustrates that during a peak time just before an off-peak time, a state of charge (SOC) is a minimum value (0) by fully discharging a battery for REC and a battery for smoothing energy is charged or discharged according to renewable power which is wind power.

FIG. 4B illustrates that as an off-peak time starts, a battery for REC is charged with renewable power and a battery for smoothing energy is charged or discharged according to controlled power which is a value of subtracting power of a PCS from renewable power.

FIG. 4C illustrates that while a battery for REC is fully charged during an off-peak time, a battery for smoothing energy is charged or discharged according to wind power.

As illustrated, an ESS in accordance with a conception of the present invention conducts a controlled operation to store renewable power and stabilize integrated power of the ESS and the renewable power.

Figure 5:
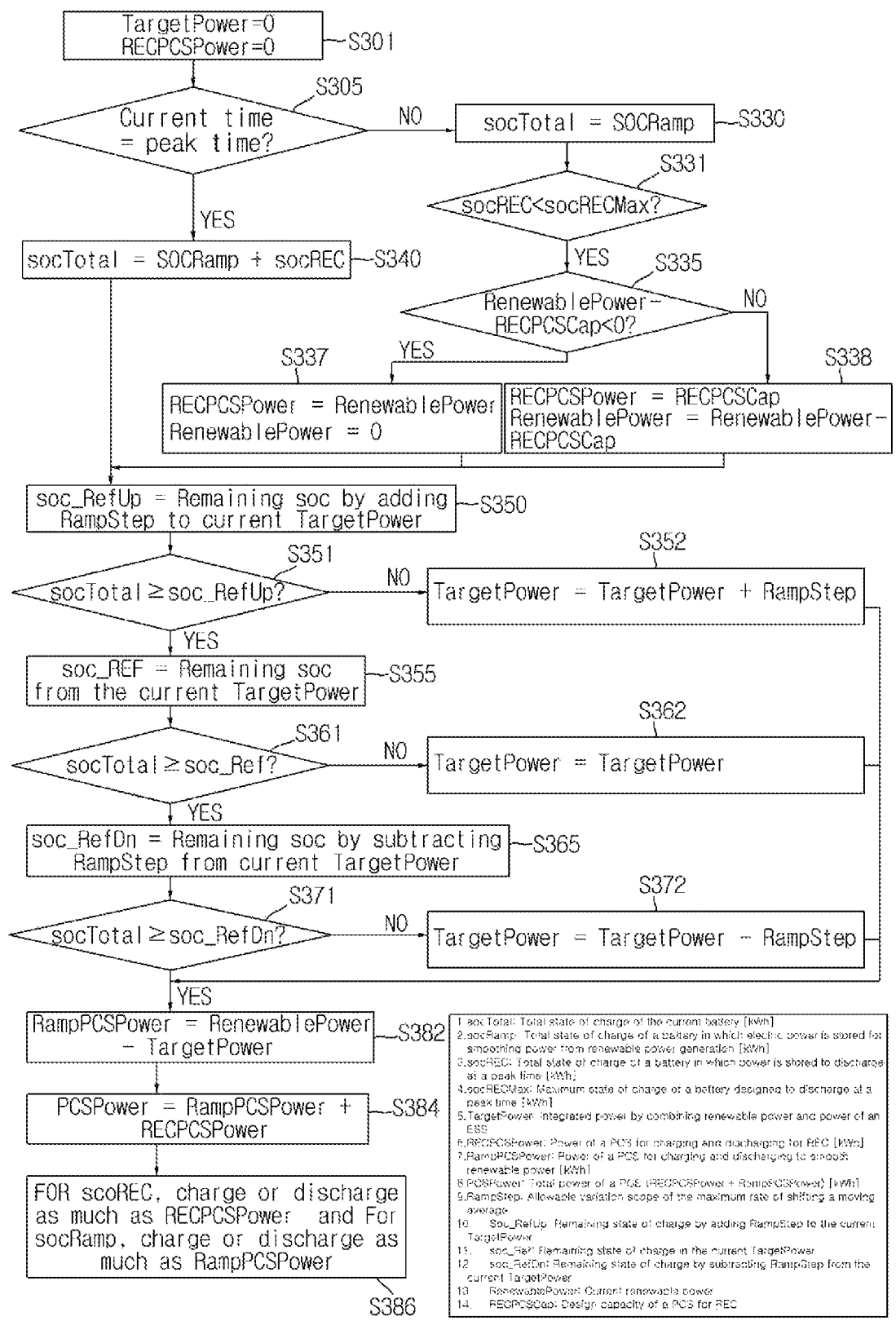
FIG. 5 is a flowchart of a method of controlling stabilization of renewable power from wind power generation in accordance with one example embodiment of the present invention.

FIG. 5 is a flowchart of a method of controlling stabilization of renewable power from wind power generation in accordance with one example embodiment of the present invention. Individual symbols in FIG. 5 refer to the followings:

socTotal: Total state of charge of the current battery socRamp: Total state of charge of a battery in which electric power is stored for smoothing power from renewable power generation socREC: Total state of charge of a battery in which power is stored to discharge at a peak time socRECMax: Maximum state of charge of a battery designed to discharge at a peak time TargetPower: Integrated power by combining renewable power and power of an ESS RECPCSPower: Power of a PCS for charging and discharging for REC RampPCSPower: Power of a PCS for charging and discharging to smooth renewable power PCSPower: Total power of a PCS (RECPCSPower+RampPCSPower)

RampStep: Allowable variation scope of the maximum rate of shifting a moving average Soc_RefUp: Remaining state of charge by adding RampStep to the current TargetPower soc_Ref: Remaining state of charge in the current TargetPower soc_RefDn: Remaining state of charge by subtracting RampStep from the current TargetPower RenewablePower: Current renewable power RECPCSCap: Design capacity of a PCS for REC At an early step S301, integrated power as a value of totaling renewable power and power of the ESS is 0 and similarly, the power of the PCS for discharging or charging to store energy is also 0.

Whether the current time is a peak time or not is checked at S305. When the current time is an off-peak time, the total state of charge of the current battery (socTotal) becomes the state of charge of the battery for smoothing renewable energy (socREC) at S330. This results from having set all areas of the battery as the battery for smoothing at the previous peak time.

Next, when the state of charge of the battery set for storing energy (socREC) to discharge is smaller than the maximum state of charge by comparing socREC to socRECMax at S331, the current renewable power (RenewablePower) is compared to a design capacity of the PCS for storing energy (REC) (RECPCSCap) at S335. When the current power is smaller than the design capacity (RECPCSCap), the power of the PCS for charged for storing energy is set as the current renewable power and the current renewable power provided to the outside is set to 0 at S337. Contrarily, when the current power is greater than the design capacity (RECPCSCap), the power of the PCS charged for storing energy is set as a design capacity and the remaining power exceeding the design capacity (RECPCSCap) is set as the current renewable power provided to the outside at S338.

When the current time is a peak time at the step of S305, the total state of charge of the current battery (socTotal) becomes the sum of the state of charge of the battery for smoothing energy to smooth renewable energy (socRamp) and the state of charge of the battery for storing energy (socREC) at S340. Next, the remaining state of charge (soc_RefUp) by adding RampStep to the current integrated power (TargetPower) is set at S350.

When the total state of charge of the current battery (socTotal) is smaller than the upper state of charge limit for smoothing (soc_RefUp) at S351, the remaining state of charge for smoothing (soc_Ref) is set from the current integrated power (TargetPower) at S355. Again, when the total state of charge of the current battery (socTotal) is smaller than the remaining state of charge for smoothing (soc_Ref) at S361, the remaining state of charge (soc_RefDn), as a low state of charge limit for smoothing by subtracting RampStep from the current integrated power (TargetPower), is set at S3365.

Again, when the total state of charge of the current battery (socTotal) is smaller than the low state of charge limit for smoothing (soc_RefDn) at S371, the power of the PCS charged or discharged (RampPCSPower) for smoothing renewable energy is set by subtracting TargetPower from the current renewable power (RenewablePower) at S382.

Meanwhile, when individual conditions are satisfied at the steps of S351, S361, and S371, TargetPower is set, respectively, as TargetPower+RampStep, TargetPower, and TargetPower—RampStep at S352, S362, and S372.

After that, the total power of the PCS (PCSPower) is set to the sum of the power of the PCS charged or discharged for smoothing renewable energy (RampPCSPower) and the power of the PCS charged for storing energy (RECPCSPower) at S384.

Next, the power is charged or discharged as much as RECPCSPower for the state of charge for battery for storing energy (socREC) and it is charged or discharged as much as RampPCSPower for the state of charge for battery for smoothing (socRamp) at S386.

Figure 6:
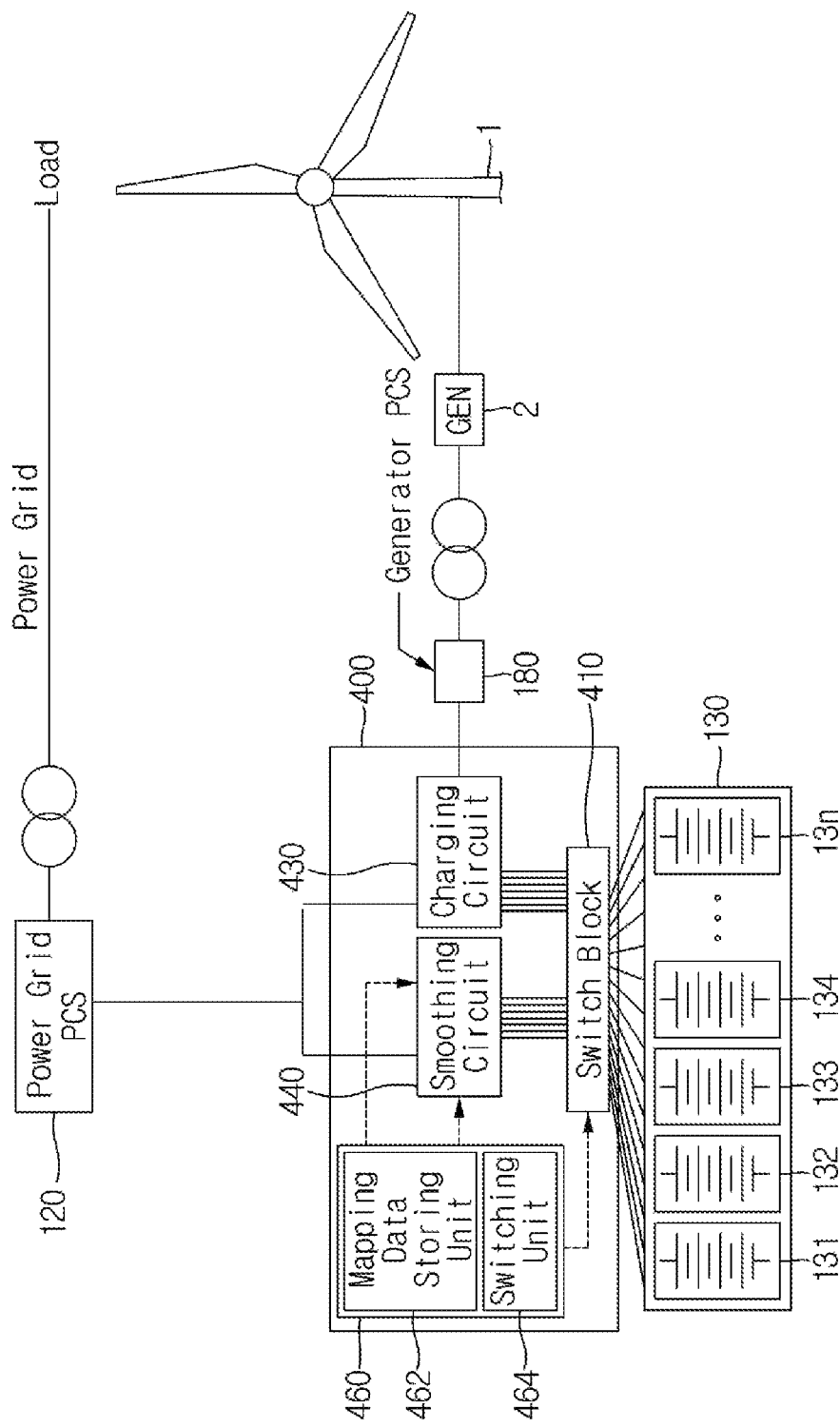
FIG. 6 is a block diagram illustrating a BMS and a battery energy storage system including it in accordance with another example embodiment of the present invention.

FIG. 6 is a block diagram illustrating a BMS and a battery energy storage system including it in accordance with another example embodiment of the present invention.

The illustrated battery energy storage system includes a generator 2 for converting natural power impressed from a windmill 1, etc. to electric power, a battery 130 with multiple battery modules 131 to 13n for storing electric power generated from the generator 2 and supplying the stored power to a power grid, a PCS 120 for converting power between the battery 130 and the power grid, a charging circuit 430 for charging the battery 130 with power inputted from the generator 2, a smoothing circuit 440 for discharging or charging the battery 130 depending on a real-time state of power shortage or surplus of the power grid, a switch block 410 for connecting the multiple battery modules 131 to 13n to the charging circuit 430, or the smoothing circuit 440, and a control circuit 460 for controlling operations of the switch block 410, the charging circuit 430, and the smoothing circuit 440, wherein the control circuit 460 virtually divides a capacity of the battery 130 into a capacity for a battery for REC and that for that for smoothing.

In accordance with an embodiment, a generator power converter 180 for converting power between the charging circuit 430 and the generator 2 may be further included. The generator power converter 180 may include an inverter for converting an alternating current into a direct current outputted from the generator 2 and delivering to the charging circuit 430.

The illustrated example embodiment is used in an environment where the generator power converter 180 connected to the charging circuit 430 and the PCS 120 connected to the power grid in which load exists are clearly divided and it is different from that in FIG. 2. In other words, the power grid has only load and it is separated from a renewable power side. It has a structure under which the power generated by using renewable energy is primarily stored in the battery 130 and supplied to the power grid.

Under the environment, according to the conventional art, the power grid and the renewable power side, which are clearly separated from each other, have separate batteries, respectively. In the present invention, the control circuit 460 of the BMS may save a battery cost by virtually dividing a state of charge of the one single battery 130 into the state of charge for a battery for REC and for a battery for smoothing and may perform smoothing stably even at a peak time of the power grid. For this end, the control circuit 460 may include a mapping data storing unit 462 for recording relationships of mapping signals for identification of the battery modules 131 to 13n and signals for identification of battery areas recognized by the charging circuit 430 and the smoothing circuit 440, and a switching unit 464 for creating switching signals of individual switches included in the switch block 410 depending on the stored mapping data.

As the structure except for the structure of separating the power grid from the renewable power side is similar to the case as specified in FIG. 2, detailed explanation on the duplicate components will be omitted.

It is noted that the aforementioned example embodiment is only for explanation and it is not for limitation. Besides, those skilled in the art of the present invention could understand that a variety of example embodiments are allowed in a scope of technical concept of the present invention.

The implementation of the BMS and the battery energy storage system of the present invention in accordance with the aforementioned configuration has an effect of satisfying purposes of both storing and smoothing energy at lower costs.

More specifically, the BMS and the battery energy storage system of the present invention has another effect of reducing peak load and preventing sharp frequency fluctuation of a power grid in advance by controlling power variation simultaneously while charging or discharging renewable power at a required time.

The BMS and the battery energy storage system of the present invention also has an effect of minimizing costs required for the ESS applied to a renewable power generation system.

Specifically, the BMS and the battery energy storage system of the present invention has an effect of reducing installation costs and increasing operational efficiency by optimizing the capacity of the ESS.

INDUSTRIAL AVAILABILITY

The present invention which relates to a battery management system and a battery energy storage system is available in a field of batteries.

What is claimed is:

1. A battery energy storage system, comprising:
   a power generator for converting renewable energy into electric power;
   a battery including multiple battery modules for storing the electric power generated by the power generator and supplying the stored electric power to a power grid;
   a power control system (PCS) for converting the electric power between the battery and the power grid;
   a charging circuit for charging the battery with the electric power inputted from the PCS or the power generator;
   a smoothing circuit for charging or discharging the battery depending on a real-time state of power shortage or surplus of the power grid;
   a switch block for connecting the multiple battery modules to the PCS or the charging circuit or the smoothing circuit; and
   a control circuit for controlling operations of the switch block, the charging circuit, and the smoothing circuit,
   wherein the control circuit sets some of the multiple battery modules included in the battery as battery modules for storing energy and other modules as battery modules for smoothing,
   wherein the control circuit prevents first battery modules set for smoothing at a first off-peak time before a peak time and second battery modules set for smoothing at a second off-peak time after the peak time from being overlapped,
   wherein the control circuit charges the electric power in the battery modules for storing energy when a capacity of the battery modules for storing energy is smaller than a designed capacity thereof, and charges in or discharges from the battery modules for smoothing when the capacity is greater than the designed capacity, and
   wherein the control circuit applies a capacity of the battery which combines the capacity of the battery modules for storing energy and a capacity of the battery modules for smoothing during a charging time, when a current time is to discharge energy stored in the battery,
   wherein an integrated power is a power integrating an output from the power generator with an output from the battery, and
   wherein the control circuit controls the battery modules set for smoothing in such a way that, when a current capacity is greater than a remaining capacity of power resulting from a maximum shifting rate of a moving average of the integrated power added to a current integrated power, the integrated power is increased up to the maximum shifting rate, and that, when the current capacity is greater than a remaining capacity of the current integrated power, the integrated power remains as it is, and that, when the current capacity is greater than the remaining capacity of power resulting from the maximum shifting rate of the moving average of the integrated power subtracted from the current integrated power, the integrated power is decreased down to the maximum shifting rate.

2. The battery energy storage system of claim 1, wherein the control circuit conducts a smoothing operation by adding energy to the battery modules for smoothing from the energy stored in the battery modules for storing energy at a time of peak in power demand, and
   wherein, while preferentially storing surplus power in the battery modules for storing energy at an off-peak time, when the battery modules for storing energy is fully charged, it stores the power in the battery modules for smoothing.

3. The battery energy storage system of claim 1, wherein the switch block switches in a multiplexing method.

4. The battery energy storage system of claim 3, wherein the control circuit includes a mapping data storing circuit for recording relationships of mapping signals for identification of the battery modules and signals for identification of battery areas recognized by the charging circuit and the smoothing circuit; and a switching circuit for creating switching signals of individual switches included in the switch block depending on the stored mapping data.

5. The battery energy storage system of claim 1, wherein, when the peak time starts, the control circuit sets the battery modules set for storing energy as those for smoothing in which charging or discharging takes a higher priority at smoothing work over the battery modules set for smoothing at an off-peak time; and wherein, when the peak time ends, the control circuit preferentially sets charged modules, among the battery modules that have been set for smoothing, as the battery modules for storing energy.

6. The battery energy storage system of claim 1, wherein the control circuit sets some of the battery modules as the battery modules for storing energy depending on information on a state of charge inputted from outside and sets others of the battery modules as the battery modules for smoothing depending on information on power variation inputted therefrom.

* * * * *